Aug. 4, 1959  J. T. CLARK  2,897,726
ADJUSTABLE MIRROW ASSEMBLY FOR MOTOR VEHICLES
Filed July 2, 1956  2 Sheets-Sheet 1
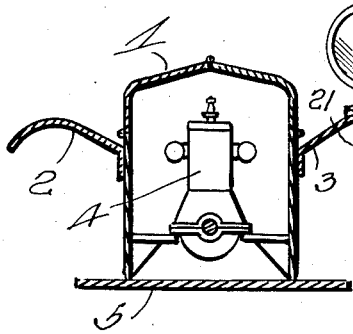
Fig. 1
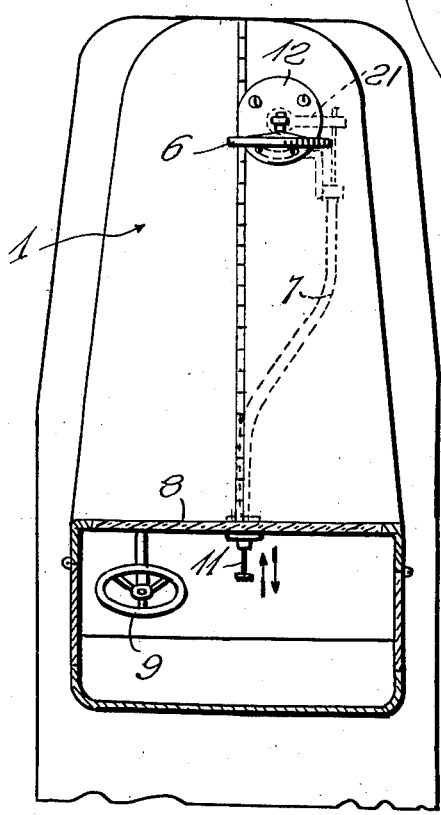
Fig. 2
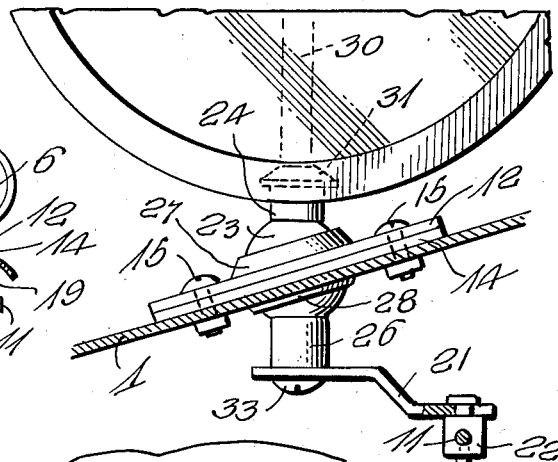
Fig. 3
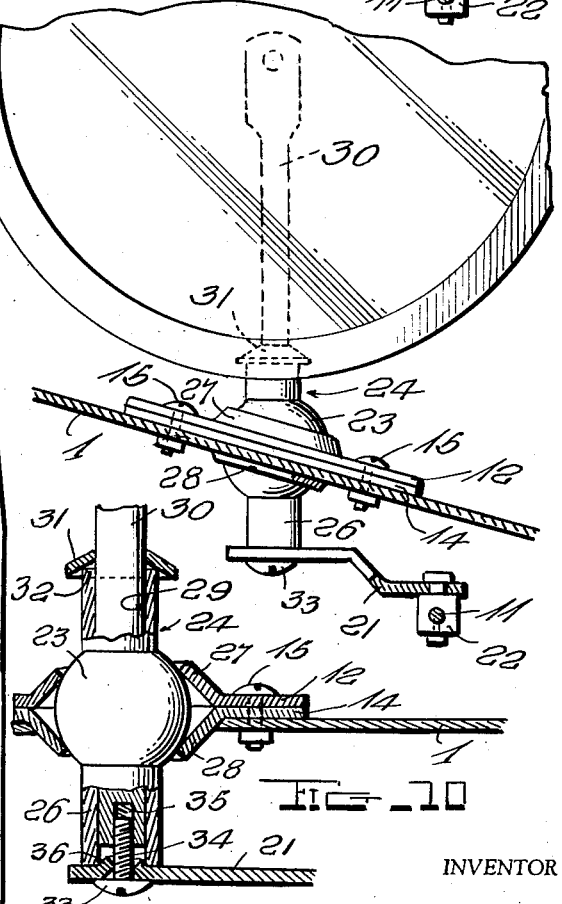
Fig. 4
Fig. 10
INVENTOR
James Tyrell Clark,
BY
John B. Brady
ATTORNEY

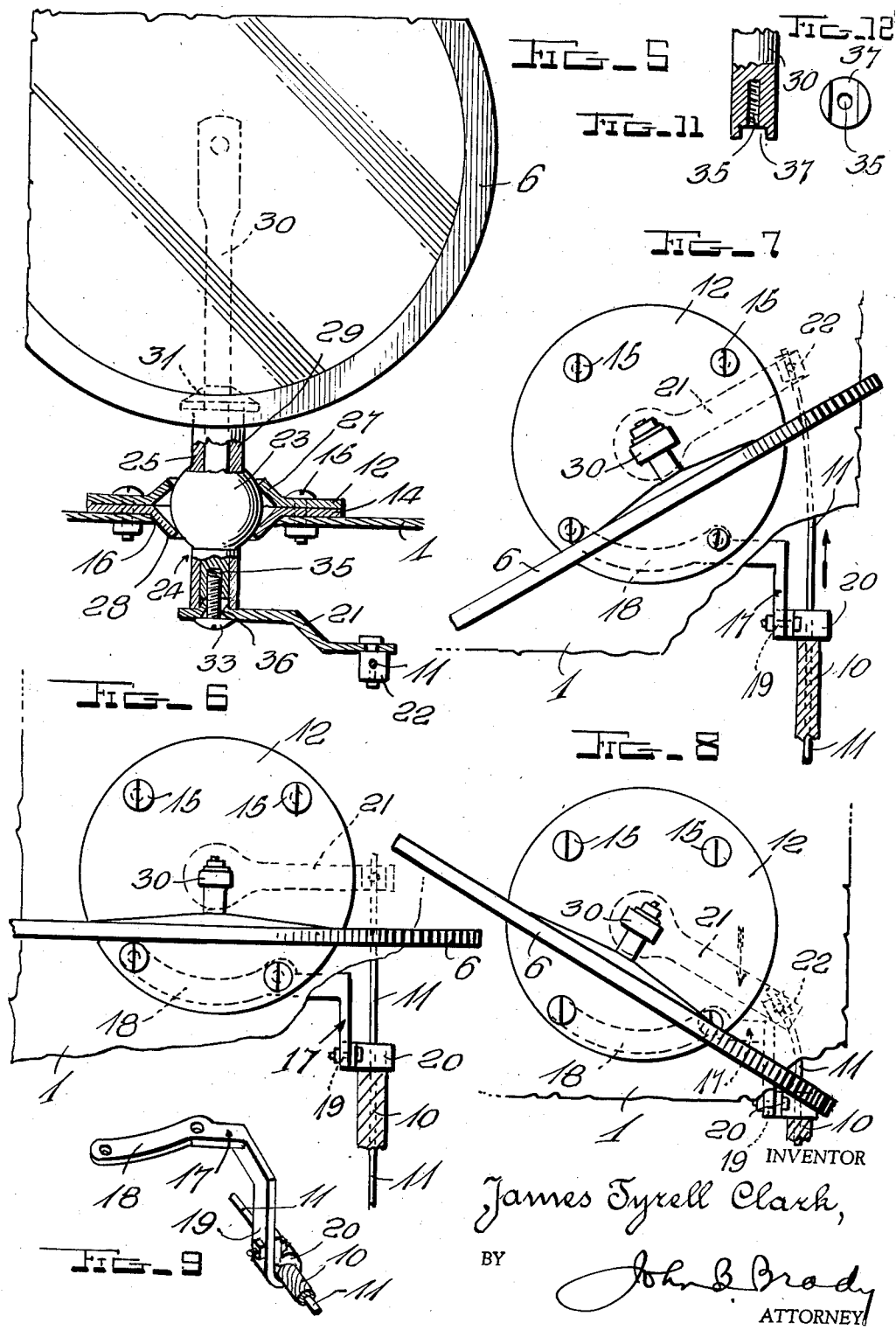

United States Patent Office 2,897,726
Patented Aug. 4, 1959

2,897,726

ADJUSTABLE MIRROR ASSEMBLY FOR MOTOR VEHICLES

James Tyrell Clark, Nokomis School, Fla.

Application July 2, 1956, Serial No. 595,242

1 Claim. (Cl. 88—93)

My invention relates broadly to safety devices for motor vehicles and more particularly to a wide vision mirror attachment for motor trucks.

One of the objects of my invention is to provide an adjustable mirror assembly which is readily applicable to motor trucks for providing wide vision for the truck driver and increasing safety in truck operation and eliminating hazards due to blind spots and congested areas at crossroad approaches, blind alleys between buildings, closely located shrubbery and forestry, and in other environments where vision is obstructed.

Another object of my invention is to provide an assembly for a wide vision mirror accessory for trucks and the like where a broad vision mirror may be mounted adjacent an extreme front position on the hood or fenders of a truck and controlled from the dashboard of the vehicle to scan a wide optical angle on the normally blind side of the vehicle.

Still another of my invention is to provide a mirror assembly capable of ready installation upon the extreme front end of the hood or on one of the fenders of a truck where provision is made for accommodating the mirror assembly to contours and shapes of various hoods and fenders individual to different makes of trucks and wherein a flexible control extends from the mirror assembly beneath the hood or fender to the dashboard of the vehicle from which the mirror assembly may be selectively adjusted.

Still another object of my invention is to provide a construction of mirror assembly capable of ready installation adjacent the front of the hood or fenders of a truck where the mirror assembly is carried by a rotatable shaft journaled within a sleeve device having an external substantially spherical body thereon adapted to be gripped by members attachable to the hood or fenders and wherein the shaft journalled within the fitting bearing is selectively controllable from the dashboard of the truck for orienting the mirror assembly to such positions as will enable the driver of the truck to have clear vision over a wide range of the area adjacent the truck which is normally obstructed from vision.

Other and further objects of my invention reside in a readily marketable packaged assembly of adjustable mirror for trucks as set forth more fully in the specification hereinafter following by reference to the accompanying drawings, in which:

Fig. 1 is a schematic vertical sectional view through the hood of a truck engine and illustrating particularly the arrangement of the fenders at opposite sides of the hood, showing the mounting of the safety device of my invention on the right-hand fender;

Fig. 2 is a schematic plan view showing the mounting of the safety device of my invention adjacent the extreme front of the hood of a truck just to the right of the center line of the truck with parts broken away and shown in section to illustrate the layout of the remote control of the safety device on the dashboard of the truck;

Fig. 3 shows the method of mounting the standard of the safety device on a hood or fender structure which is inclined toward the left;

Fig. 4 illustrates the method of mounting the standard of the device on a hood or fender which is inclined toward the right;

Fig. 5 is an elevational view of the standard with parts broken away and shown in section, illustrating the parts of the fitting which mount the standard on the hood or fender;

Fig. 6 is a fragmentary top plan view of the safety device illustrating particularly the remote control means for angularly shifting the mirror to selected positions for scanning areas adjacent the vehicle which would otherwise be obscured from the operator's vision; the view showing the mirror moved to a plane substantially parallel with the transverse plane of the dashboard of the truck;

Fig. 7 is a view similar to the view shown in Fig. 6, illustrating the mirror moved to a position inclined toward the right for providing the truck operator with a maximum view of the area to the right of the truck;

Fig. 8 is a view similar to the views shown in Figs. 6 and 7 but illustrating the mirror shifted to the left for scanning the area to the left of the truck;

Fig. 9 is a perspective view of the cable guide which is connected with the clamping plate assembly in the packaged unit of my invention;

Fig. 10 is an enlarged fragmentary view showing the manner of tensioning the shaft of the mirror in the journal provided in the assembly of my invention;

Fig. 11 is a fragmentary view of the end of the shaft showing the recesses therein for interlocking the control lever with the shaft; and Fig. 12 is an end view of the shaft shown in Fig. 11 illustrating the recesses therein.

My invention is directed to an adjustable mirror assembly readily installable upon motor trucks of various makes for giving the driver rear and side vision over the area adjacent the truck which is normally obstructed. With the increase in motor truck traffic, highways have become hazardous to passenger-cars and other traffic, due, among other things, to restricted vision of motor truck operators in transit. Motor trucks of various types are often so overloaded that the pay-load itself obstructs the vision of the truck driver. The broad extension of the body of the truck often obstructs vision of the driver along the right-hand side of the truck. This cannot be corrected by conventional mirrors. The mirror assembly of my invention comprises an inexpensive and readily marketable package of parts which may be readily installed with minimum skill by any garage or small shop and which provides the truck driver with a high degree of confidence and safety in driving through congested areas.

The mirror assembly is mounted adjacent the extreme front of the hood of the vehicle or on either side of the front fenders in a position where the mirror, forming part of the mirror assembly, may be selectively oriented from the dashboard of the vehicle for scanning the blind areas behind the vehicle. The mirror assembly comprises a pair of clamping plates and an associated cable guide which may be readily clamped in position adjacent an aperture cut in a forward position in the hood or in one of the front fenders with the cable guide depending below the hood or fender when the clamping plates are secured in position. The clamping plates provide securing means for a substantially spherical member which is universally movable within the clamped plates. The said substantially spherical member carries sleeve portions on diametrically opposite ends thereof projecting above and below the hood or fender when the assembly is installed in position. A bore is formed through the substantially spherical member and the projections thereon and provides a journal for an angularly adjustable shaft which projects above the hood or fender and also extends to a position beneath the hood or fender. The upper end of the shaft carries a wide vision mirror which may be curved or plane to provide the driver with a maximum of vision in the blind areas adjacent the vehicle. The lower end of the shaft is connected to a lever device which serves as a crank arm for controlling the angular movement of the shaft. The cable guide which extends from the clamping plate assembly is provided with a cable clamp into which the end of the casing of an operating cable is secured and through which a cable core or actuating cable extends and is connected with the end of the lever or arm. The cable casing is suitably supported along the underside of the hood or fender extending to a position adjacent the dashboard of the vehicle. The core or actuating cable which extends through the cable casing and which is connected at one end to the lever or arm connects at the opposite end to a translatory adjustable device on the dashboard. This translatory adjustable device may be pulled or pushed in by the truck operator to set the mirror of the mirror assembly at a selected angular position. That is to say, the broad vision mirror adjacent the front of the truck may be remotely controlled by the truck driver to selectively move the broad vision mirror to a desire angular position depending upon conditions encountered in different driving operations. To accommodate the control cable to the raising and lowering of the hood I provide adequate slack in the length of the cable so that there is no interference with the movement of the hood. The distance to which the control member of the cable is moved at the dashboard is restricted to approximately 2" as the lineal displacement of the cable is multiplied by the leverage at the lever or arm of the assembly at the front of the vehicle.

Throughout the specification wherever I have referred to the mounting of the mirror assembly at the front of the hood or on the front fenders it should be understood that I intend the adjustable mirror assembly of my invention to be capable of mounting in that position which will give the truck driver the maximum vision of the area adjacent the truck. I generally accomplish this by mounting the adjustable mirror assembly on the front of the hood just to the right of the center line thereof. I have also found it effective to mount the adjustable mirror assembly on the right-hand fender. There are certain types of trucks and vehicles where the driver's position is located on the right of the front of the truck. Under these conditions the adjustable mirror assembly of my invention would be mounted either upon the front of the hood just to the left of the center line or the mirror assembly would be mounted on the left fender. This applies particularly to certain foreign types of trucks where the steering position is at the right of the front seat. The fact that the clamping plates in the assembly of my invention may be located in a variety of different angular positions while the supporting shaft for the mirror is maintained in a vertical position greatly facilitates the installation of the assembly of my invention on various makes and types of trucks, both foreign and domestic.

I have found the structure of my invention highly practical and successful in its operation and while the embodiment shown herein is the preferred form of my invention, I realize that modifications may be made and I desire that the embodiment of my invention as disclosed herein be considered in the illustrative sense and not in the limiting sense.

Referring to the drawings in more detail, reference character 1 designates the hood of a motor truck having left-hand fender 2 and right-hand fender 3. The truck engine is represented generally at 4 supported with respect to the truck chassis 5. The safety device of my invention is shown in Fig. 1 as mounted on the front of the right-hand fender 3 and consists of the scanning mirror 6 which is angularly movable by means of a remotely controlled cable designated at 7 which leads to the driver's position on the dashboard of the truck.

In Fig. 2 I have shown my invention applied to the hood of a truck. In this arrangement the scanning mirror 6 is located at the extreme front of the hood 1 and just to the right of the center line thereof and is controllable in angular position by means of cable 7 operative from a location on the dashboard 8 of the truck convenient to the driver's position shown at 9. The cable 7 consists of an exterior flexible casing 10 housing an internal slidable core or control wire 11 which when pushed or pulled, controls the angular setting of the mirror 6. The hardware comprising the packaged accessory of my invention includes a pair of clamping plates shown at 12 and 14 (Figs. 3–5) which are secured by means of fastening bolts 15 around the periphery of the perforation 16 formed in the hood 1. When installing the safety device in the hood a circular aperture 16 is cut in the hood for the passage of the assembly consisting of the clamping plates 12 and 14 and the cable guide 17. The cable guide 17 consists of a plate 18 which is secured by means of bolts 15 beneath hood 1 and is shaped as represented more clearly in Fig. 9 to include a depending portion 19 terminating in the cable clamp 20 into which the end of the flexible housing 10 is fastened in a position beneath the hood 1 and substantially in alignment with the end of the control arm or lever 21 of the mirror assembly as shown more clearly in Figs. 6–8. The control wire or core of the cable 7 is slidable through the housing 10 and connects with the clamping device 22 on the end of the lever or arm 21.

The mounting for the mirror includes a member 24 which is tubular, having a central substantially spherical portion 23 and contiguous upwardly and downwardly extending portions represented at 25 and 26 integral with the substantially spherical portion 23. The clamping plates 12 and 14 are shaped to provide centrally disposed frusto-conical portions 27 and 28 which project upwardly and downwardly and serve to retain the substantially spherical portion 23 in position for universal movement. The substantially spherical portion 23 is frictionally gripped within the frusto-conical portions 27 and 28 of the clamping plates 12 and 14 respectively. The frusto-conical portions 27 and 28 are so dimensioned and tensioned with respect to the substantially spherical portion 23 that the adjustable assembly, comprising upwardly and downwardly extending tubular portions 25 and 26 and the substantially spherical portion 23, may be maintained in any selected position to which the assembly is set. The upwardly and downwardly extending portions 25 and 26 and the substantially spherical portion 23 have a bore 29 extending longitudinally therethrough which serves as a journal for the vertically disposed shaft 30.

The vertically disposed shaft 30 is mounted in the journal formed by the bore 29 in a very special manner. A flexible and resilient frusto-conical shaped collar 31, forming a watershed, is attached to the shaft 30 and extend over the upper end of the upwardly extending sleeve-like portion 25 and makes annular peripheral contact with the outside edge thereof as shown more particularly in Fig. 10. The collar 31 is flexible and resilient and accordingly can be drawn downwardly in tension against the upper edge 32 of the upwardly extending sleeve-like portion 25. This is accomplished by means of screw device 33 which extends through lever 21 into the internal screw-threads 34 in the end of shaft 30. The screw-threaded recess in the end of shaft 30 is shown at 35 and is deeper than the limiting distance to which screw 33 may be adjusted. The arm or lever 21 is provided with upstruck projections 36 which interlock with recesses 37 (Figs. 11 and 12) formed in the end of the shaft 30, whereby angular movement may be imparted to shaft 30. The end of the downwardly projecting portion 26 of the fitting extends slightly beyond the end of shaft 30 when shaft 30 is mounted in position with collar 31 resting upon the peripheral edge 32 of the upwardly projecting portion 25 of the fitting. Thus screw 33 may be turned to variably engage the internal screw threads 35 to draw shaft 30 downwardly with the collar 31 in tension against the upper angular edge 32. This insures the assembly against rattling due to normal vehicle vibration in transit.

In the operation of my invention the mirror 6 may be adjusted on the end of the shaft 30 and thereafter shaft 30 may be suitably adjusted in vertical position by moving the shaft 30 and the substantially spherical portion thereof within the clamping plates 12 and 14. The operator of the truck may then remotely control the angular position of the mirror, to the right or left, by moving the control wire 11 from the dashboard location which serves the shift the mirror angularly through the connection 22 between the end of the control wire 11 and the lever or arm 21 so that normally blind areas adjacent the vehicle may be readily scanned by the truck driver according to conditions which may arise, from time to time, in traffic. The packaged assembly of parts in accordance with my invention is readily installable upon various makes of trucks for thereby improving truck operation in congested traffic.

While I have described my invention in certain of its embodiments, I realize that modifications may be made and I desire that it be understood that no limitations upon my invention are intended other than may be imposed by the scope of the appended claim.

What I claim as new and desire to secure by Letters Patent of the United States, is as follows:

An adjustable mirror assembly for vehicles comprising a pair of clamping plates adapted to be fastened in a complementary assembly about the internal periphery of a perforation formed in a support, a cable bracket fixed to said plates and depending therefrom, a cable clamp on the terminating end of said cable bracket in a position substantially displaced from said clamping plates, a sphere adjustably mounted between said clamping plates, a tubular extension on diametrically opposite sides of said sphere extending in a substantially downwardly and upwardly direction, a bore extending lineally through said sphere and said tubular extension and forming an internal cylindrical bearing, a shaft member mounted within said cylindrical bearing with one end of said shaft member projecting downwardly into the tubular extension on one side of said sphere and the other end of said shaft member projecting upwardly above the tubular extension on the other side of said sphere and axially revolvable in said cylindrical bearing and supporting a mirror on the upper extremity thereof, a lever arm connected with the lower end of said shaft member and rotatably engaging the lower end of said downwardly projecting tubular extension and extending radially to a position adjacent said cable clamp, a cable casing clamped within said cable clamp, an actuating cable axially adjustable within said casing and connected at one end with said lever arm, remote control means at the opposite end of said actuating cable for remotely controlling the displacement thereof within said casing and correspondingly controlling the annular displacement of said shaft member and in which said shaft member carries a frusto-conical shaped resilient collar adjacent the upper end thereof establishing frictional engagement with the upper peripheral edge of the upwardly projecting tubular projection on said sphere and wherein the lower end of said shaft member terminates short of the lower end of the downwardly projecting tubular extension on said sphere, adjustable means interposed between the connection of said lever arm with the lower end of said shaft member for axially adjusting the shaft member lineally within said cylindrical bearing against the tension of said frusto-conical shaped resilient collar, the under surface of which abuts with said upper periphery of the upwardly projecting tubular projection on said sphere.

References Cited in the file of this patent

UNITED STATES PATENTS

| 1,392,424 | Linstrom | Oct. 4, 1921 |
| 1,570,024 | Wood | Jan. 19, 1926 |
| 1,612,960 | Anderson | Jan. 4, 1927 |
| 1,684,695 | Draper | Sept. 18, 1928 |
| 1,728,931 | Griffey | Sept. 24, 1929 |
| 2,573,127 | Von Bredow | Oct. 30, 1951 |

FOREIGN PATENTS

| 450,982 | Italy | Aug. 19, 1949 |